March 2, 1965     R. J. FORD ETAL     3,171,163
MOLD WITH FIRST AND SECOND HINGED PORTIONS COMPOSED OF
LAMINATIONS ADJUSTABLE WITH RESPECT TO ONE ANOTHER Filed Feb. 11, 1963     5 Sheets-Sheet 1

FIG. 1

INVENTORS.
ROBERT J. FORD
GEORGE H. GUCKES
BY
*Franklin J. Vieh*
ATTORNEY

United States Patent Office 3,171,163
Patented Mar. 2, 1965

3,171,163
MOLD WITH FIRST AND SECOND HINGED POR-
TIONS COMPOSED OF LAMINATIONS ADJUST-
ABLE WITH RESPECT TO ONE ANOTHER
Robert J. Ford, Folsom, Pa., and George H. Guckes,
Audubon, N.J., assignors to The Boeing Company,
Seattle, Wash., a corporation of Delaware
Filed Feb. 11, 1963, Ser. No. 257,647
15 Claims. (Cl. 18—34)

This invention relates to molding apparatus and, more particularly, to a combination forming tool and mold for use in single or multiple stage manufacture of articles of varying sizes and contours.

The general advancement of rotary wing technology has resulted in increased requirements for the rotor blades employed on rotary wing aircraft. It has been a need in the art of rotary blades to develop rotor blades, which are economical to manufacture, non-corrosive, and characterized by improved fatigue properties. Additionally, rotor blades have been desired to have the characteristic of being lighter in weight per unit area of lift surface while having the required stiffness and strength. Accordingly, the advance of the technology in plastics has provided the means through which to develop a plastic rotor blade, which is characterized by the above enumerated advantages. This invention pertains to the development of a tool or mold having the capability of producing such a rotor blade.

The mold of this invention utilizes a plurality of hinge members for offering heretofore unavailable flexibility of use. That is, the mold of this invention has the advantageous capability of varying the positions of at least a part of the hinged members thereof for a particular molding operation. It advantageously employs the variably positioned hinged members to enable a plurality of different molding operations and the utilization of selected tools or forming mandrels during molding operations. More particularly, the mold of this invention includes an inner cavity, which may be at least partially open or completely closed during molding operations by actuators which also provide a clamping action upon material within the inner cavity.

The hinged members of the mold of this invention are laminated to enable less costly manufacture of the tool and to allow a more accurate control of the contour of each lamination and ultimately the tool. An additional advantage of the tool of this invention is the capability to be set at a desired blade twist and changed to provide a greater or lesser twist into a rotor blade molded therein.

Further, this invention is adjustable to produce a rotor blade having either a left or right hand twist as desired. Thus, the cost of a separate tool for changes in the degree or direction of twist is eliminated.

Accordingly, an object of this invention is to provide a mold so constructed and arranged as to be capable of undergoing variations in size, contour, and angularity in accordance with materials and articles to be formed and molded therein and moreover, to accomplish the above in an efficient, simplified manner.

It is another object of the present invention to provide a forming and shaping tool of laminated segmental construction, which is conformable for use in single or multiple stage forming and shaping of articles of varying sizes and shapes and is further adaptable for bonding or molding such articles together into a member of unitary construction; wherein the tool is of variable contour and size and permits variations both in the direction and manner of applying pressure to materials in the forming and molding operations.

It is still another object to provide molding apparatus including a support structure which will undergo a minimum overall linear expansion with the apparatus being relatively inexpensive and easy to construct and to repair.

A further object is to provide for improved heating, adjusting, and supporting of molding apparatus as well as to provide for accurate positioning and supporting of articles of different sizes and shapes within a mold during forming and molding operations.

A still further object is to provide an improved laminated mold construction having a series of laminations interconnected together and supported in such a way as to attain improved heating and supporting of objects positioned in the mold and to permit adjustment in angularity and size of the mold cavity according to differences in shape and size of objects supported for molding therein.

It is an additional object to provide for a combination fixture and mold for use in forming and molding materials and combinations of materials of different properties and contours into a unitary article and having special application in the manufacture of elongated plastic articles, such as, rotor blades with the combined requisites of undergoing both gradual and abrupt transitions and shape and angularity combined with high strength and flexibility characteristics.

Other objects of this invention will be readily perceived from the following description.

This invention relates to molding apparatus comprising complementary mold portions defining a mold cavity therebetween. A former is disposed in the mold cavity for engaging an object to be molded therein. Pressure applying means are secured to the mold portions and adapted to urge the former into engagement with the object to be molded.

Additionally, this invention relates to molding apparatus having a support and complementary mold portions defining a mold cavity therebetween. Each of the mold portions is formed of a series of laminations interconnected in abutting face-to-face relation. Further, means are provided for connecting the mold portions to the support in hinged together relation. Additionally, mold supporting means are included between the mold portions and the support to move at least one of the mold portions between the open and closed positions to provide for insertion and positioning of an object to be molded in the mold cavity.

This invention also relates to a mold comprising complementary mold portions defining a mold cavity therebetween wherein each of the mold portions is formed of juxtaposed mold sections. The mold also comprises means pivotally interconnecting the mold sections of each mold portion including actuating means therebetween to support the mold sections of each mold portion in predetermined relation to one another.

The attached drawings illustrate a preferred embodiment of the invention in which.

The unique features and advantages of the present invention are best exemplified by reference to the use of a preferred form of molding apparatus in the manufacture of rotor blades for rotary wing aircraft. A plastic rotor blade of the type disclosed in a copending application for Letters Patent of Robert J. Ford and Tadeusz Tarczynski entitled Blade and Method of Making Same, Serial No. 257,546, filed concurrently herewith and assigned to the assignee of this application represents a typical application of this molding apparatus. The rotor blade broadly comprises a leading edge section with a nose cap and an outer blade skin surface bonded thereto. A pre-formed metal root end socket and a core mandrel are bonded together at the inboard end of the blade. The mandrel serves to locate and position a spar section, which extends from the inboard end substantially throughout the length of the blade and adjacent the leading edge section. While the skin is composed of one or more layers of bias-laid reinforced plastic material, the spar is composed of a plurality of layers of bias-laid reinforced plastic material at its inboard end and a plurality of layers of unidirectionally laid reinforced plastic material along the entire length thereof. The spar section is formed within the mold to undergo a gradual transition from circular to generally elliptical to an open arcuate shape.

In addition to the separate forming and molding operations employed to unite the skin, the leading edge, and the spar sections, the mold is further designed to permit subsequent insertion and molding of a core and a trailing edge wedge section within the skin. Also of importance is the fact that the mold may be twisted and, therefore, adjusted to form either a left or a right hand blade in accordance with conventional requirements. Thus, the use of separate molds for each individual variation in blade twist is avoided.

Referring to the drawings and particularly FIGURES 1 to 4, there is shown a preferred form of molding apparatus or forming tool comprising complementary mold halves defined by upper left and right laminated mold sections 10 and 11. The upper left and right laminated mold sections 10 and 11 are, respectively, connected to lower left and right laminated mold sections 12 and 13 through hinge pins 14, which extend the length of the tool. In turn, the lower left and right laminate members 12 and 13 are pivotally connected to a base support 15 by a common hinge pin 16, which also extends the length of the tool.

As illustrated in FIGURES 1 to 4, the main tool support structure or base support 15 includes an elongated cylindrical support 18 extending the length of the tool and having a plurality of transverse cylindrical support arms 19 at spaced intervals along the length thereof. Further, the support comprises spaced longitudinally extending pins 20 welded to the upper surface of the cylinder 18 for securing a horizontal plate 22 to the cylinder 18. In turn, hinge members 23 are connected in fixed relation along the plate 22 by suitable fasteners such as connecting screws 24. Additionally, the hinge members 23 have upwardly extending ear portions 25 at spaced intervals along the length of the tool with aligned bores for receiving the hinge pin 16. It should be understood that the support arms 19 may include suitable fasteners (not shown) at the ends thereof for further fastening and supporting of the tool, for example, to additional support structure or to a floor surface.

In order to adjustably support the mold halves in open and closed relation, the base support 15 also includes a series of transverse support arms 26, which extend upwardly at spaced intervals along opposite sides of the cylinder 18. Each of the support arms 26 has outer spaced extensions 27 and an aperture 28 in spaced relation above the extensions 27. Along the right side of the base as viewed in FIGURE 4, the extensions 27 are disposed for pivotal connection to the lower ends of hydraulic actuator assemblies 30. Further, a pivot pin 31 is inserted through each of the apertures 28 in the extensions on the right of the tool, as viewed in FIGURES 3 and 4, for pivotal connection to an adjustable connecting rod 32. The connecting rod 32 extends upwardly from the pivot pin 31 for connection to the lower right mold section 13.

Figures 3, 3A, 4:
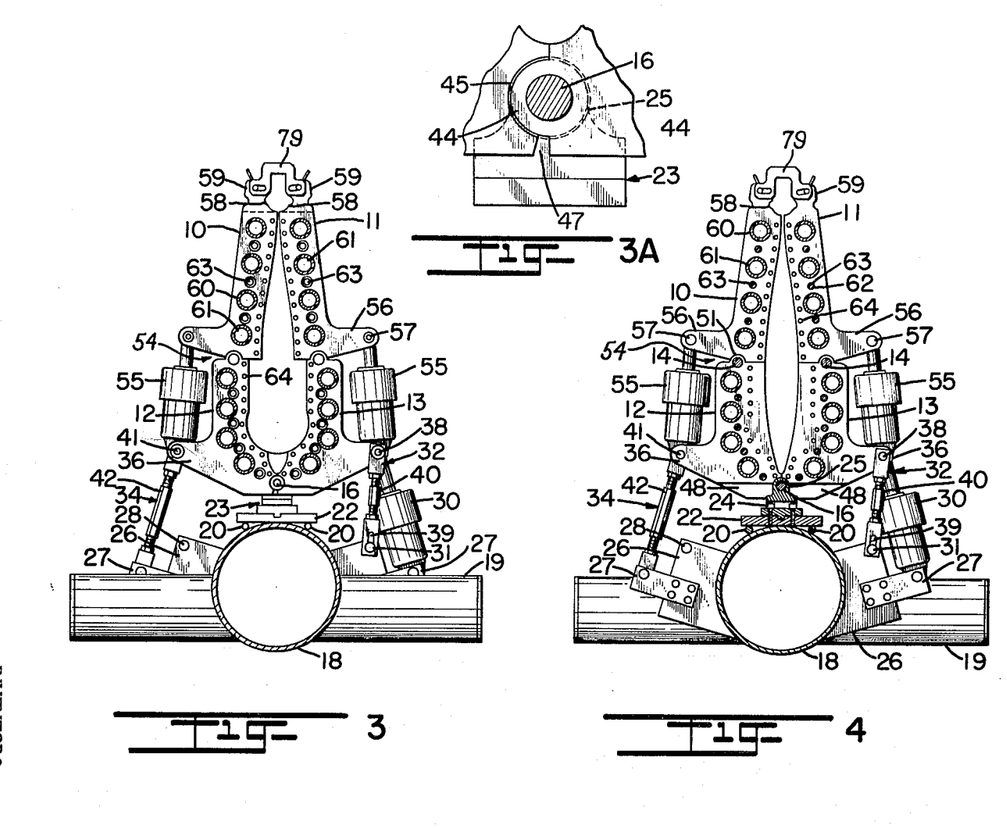
FIGURE 3 is a sectional view taken on line 3—3 of FIGURE 2.
FIGURE 3A is an enlarged fragmentary view showing the pivotal connection between the lower mold sections and the base support.
FIGURE 4 is a sectional view taken on line 4—4 of FIGURE 2.
Figure 5:
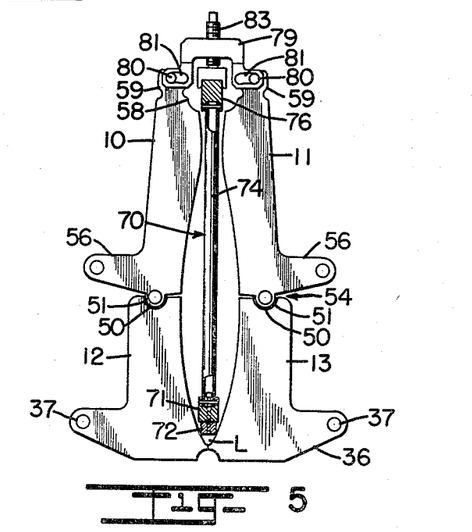
FIGURE 5 is a schematic sectional view illustrating the disposition of a mandrel within the molding apparatus for the purpose of forming the leading edge section of a rotor blade.

Along the left side of the base, as viewed in FIGURES 3 and 4, connecting rods 34 are arranged for pivotal interconnection at their lower ends to the extensions 27 and at their upper ends to the lower left mold section 12. It will be observed in this connection that the support arms 26 including their extensions 27 are correspondingly formed on opposite sides of the tool to permit interconnection in the desired relation of the connecting rods 32 and 34 and the hydraulic actuators 30 for the purpose of controlling and establishing the desired angularity and relative disposition of the mold halves.

Figure 1:
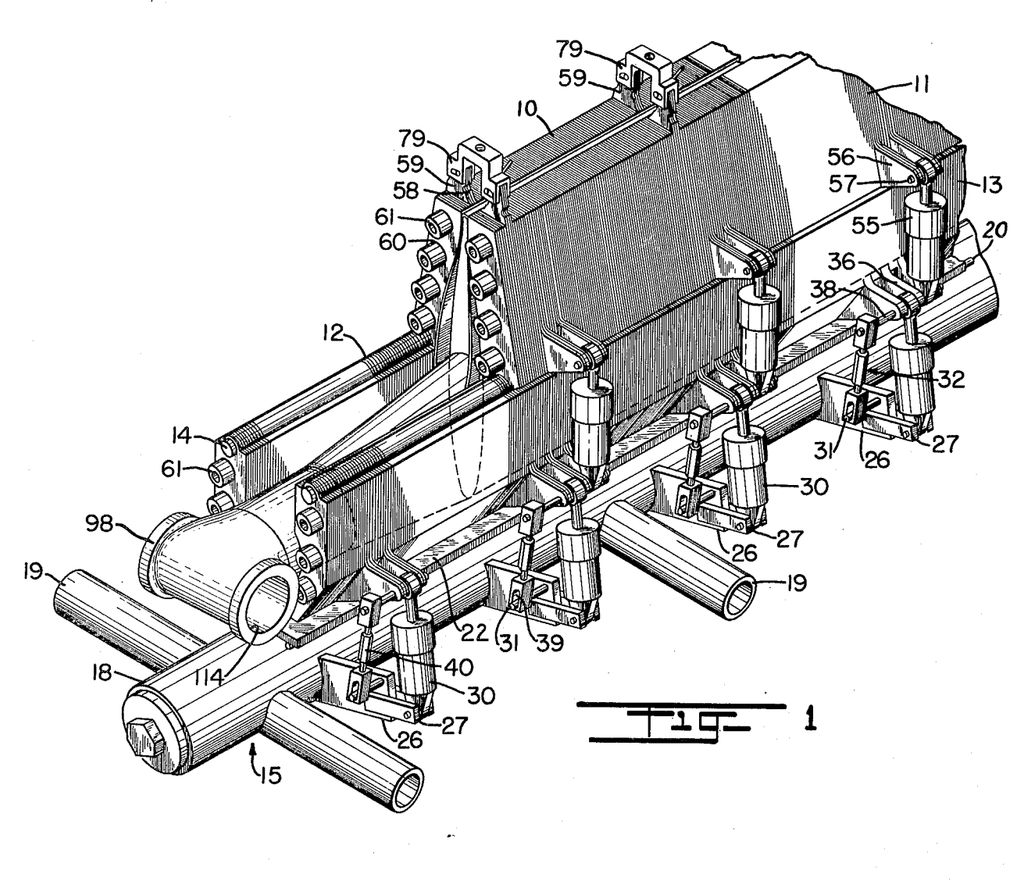
FIGURE 1 is a perspective view showing a portion of a preferred form of molding apparatus adapted for use in the manufacture of a rotor blade.
Figure 2:
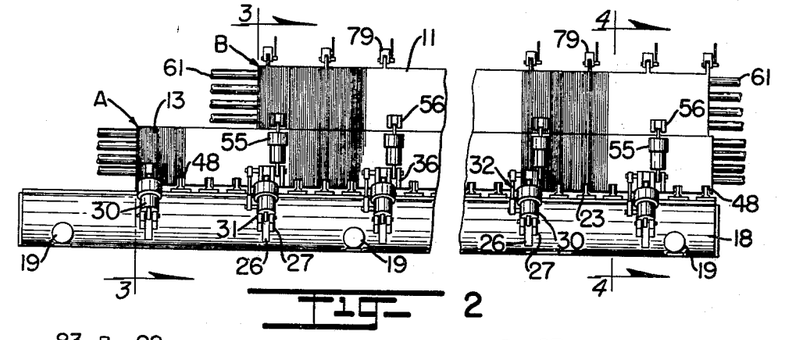
FIGURE 2 is a front view in elevation of the molding apparatus.

As illustrated in FIGURES 1 and 2, the lower laminated sections 12 and 13 begin at station A, and the upper laminated sections begin at station B. Individually, each of the sections is comprised of a series of relatively thin laminations disposed in face-to-face, contacting relation with the inner edges of the laminations together defining the desired internal configuration of the mold cavity as shown in FIGURES 3 to 6.

For the purpose of illustration, each lamination is preferably composed of cold-rolled steel having a thickness on the order of $1/16$ of an inch, and each is specially formed of a selected configuration having connecting elements where required according to its location in the tool. For instance, in spaced relation above each of the arms 26, certain of the laminations in the lower mold sections 12 and 13 are formed with outwardly extending ears 36 grouped in pairs at spaced intervals along their lower surfaces. Each group of laminations having outwardly extending ears 36 also includes aligned apertures 37 for reception of a pin 38. Each of the pins 38 serves to pivotally connect the upper end of each respective hydraulic actuator 39 and the associated connecting rod 32 to the ears 36 of the lower mold section along the right side of the tool.

Each connecting rod 32 includes a lost motion slot 39 for receiving the lower pivot pin 31 and a turnbuckle 40 for lengthening or shortening the connecting rod 34. In this manner, the initial disposition of the lower right mold section 13 in relation to the support structure 15 is established. Similarly, a pin 41 connects the connecting rod 34 to the ears 36 of the lower left mold section 12. Again, the rod 34 includes a turnbuckle member 42 for adjustably lengthening or shortening it to control the angular disposition of the mold section 12 with respect to the support structure 15.

To pivotally connect the lower mold sections 12 and 13 to the base support 15, the laminations of each section are alternately provided with ears 44 and grooves 45 (see FIGURE 3A). The ears 44 have aligned bores therein for reception of the hinge pin 16. When connected, the ears and grooves on alternate laminations are arranged in complementary relation so as to mate with one another. A slotted portion 47 is in the laminations of the mold member 12 to permit limited outward pivotal movement of the mold section 13 with respect thereto. Furthermore, at spaced points along the length of the hinge pin 16, opposite laminations are similarly grooved, as at 48 in FIGURE 4, to permit interpositioning of the ear portions 25 of the hinge members 23.

Similarly, the upper and lower laminated sections of each mold half are provided with complementary ears 50 and grooves 51 alternating with one another along the length of the tool. Additionally, the ears 50 have aligned bores for reception of the hinge pins 14, and the lower surfaces of the upper laminations are relieved as at 54 to permit limited pivotal movement of the upper mold sections 10 and 11 with respect to the lower mold sections 12 and 13. However, this pivotal movement is controlled by the use of upper hydraulic actuators 55 having their lower extremities connected to the pivot pins 38 and 41 and their upper extremities pivotally connected to outwardly extending ears 56, which are grouped in pairs along the length of the upper mold sections 10 and 11. Again, pivot pins 57 are passed through aligned bores in the spaced groups of the ears 56 to pivotally interconnect the actuators 55 to the upper mold sections 10 and 11.

The laminations comprising the upper mold sections 10 and 11 are, additionally, formed with inwardly facing recessed portions 58 along their upper edges defining the entrance into the mold cavity. Spaced groups of the laminations of the upper mold sections or laminate members 10 and 11 have upwardly extending projections 59 for the purpose of interconnecting the mold sections 10 and 11 as well as for connecting and supporting various mandrels employed during the process of molding the rotor blade within the cavity.

For the combined purpose of heating and interconnecting the laminations in each mold section, each of the laminations of the upper and lower sections 10–14 employs a series of large bores 60 for the insertion therethrough of a plurality of steam pipes 61. The laminations also include a series of smaller bores 62 for the insertion of a plurality of rods 63, which take the configuration of nut and bolt members for fixedly uniting all the laminations of each of the laminate members into unitary sections. Bores 64 also are employed in each of the laminations to receive electric cartridges for the purpose of rapid heating to supplement the steam heating of the tool if it should be required.

It should be understood that, when the twist of a blade desired to be formed by the tool or mold is to be changed, the tool is opened and the connecting rods 34 on the left of the mold, as viewed in FIGURE 4, are adjusted first. That is, the turnbuckles 42 of the connecting rods 34, which are spaced along the length of the tool, are adjusted to lengthen or shorten the connecting rods 34. Then a spacer, which conforms to the width of the blade, is placed between the lower mold sections 12 and 13 and the mold is closed. Thereafter, the turnbuckles 40 of the connecting rods 32, which are spaced along the right side of the mold as viewed in FIGURE 4, are adjusted to insure that the mold conforms to the plastic blade and its desired twist that is to be formed in the mold. Of course, no adjustment of the upper mold sections 10 and 11 is necessary since they follow the adjustments imparted to the lower mold sections 12 and 13. Additionally, it should be understood that the generally required blade twist requirements are so slight that the steam pipes 61 and the rod members 63 in the sections 12 and 13 are not twisted. That is, the laminations of the mold sections shift sufficiently about the steam pipes 61 and the rod member 63 because of the tolerances between the steam pipes 61 and rod members 63 and their bores 60 and 62, respectively.

In connected relation, it can be seen by reference to FIGURES 3 and 4 that the mold halves have common connecting means defined by the lower hinge members 23 and the pin 16 for pivotally connecting the mold halves to the base support 15. The lower left mold section 12 is always held in fixed relation to the base support 15 by the connecting rods 34, which are adjusted by the turnbuckles 42 to preset the tool to mold the blade in the desired blade twist. The tool is open when the upper left mold section 10 and the right mold sections 11 and 13 have been pivotally rotated about their hinge pins in a direction outwardly from a vertical plane, which extends through the longitudinal axis of the cylinder support 18. When the tool is driven to this open position by the hydraulic actuators 30 and 55, the tool is ready for the insertion of material and mandrels employed for forming the plastic blade.

When it is desired to close the tool, the hydraulic actuators 30 operate to rotate the lower mold section 13 about the hinge pin 16 until the pins 31 have reached the lower ends of the lost motion slots 39. At this point the mold section 13 has reached the end of its rotation about the hinge pin 16, and the upper mold sections 10 and 11 are now closed by the operation of the actuators 55. The actuators 55 rotate the mold sections 10 and 11 about the hinge pins 14 until the lower inner surface portions of the upper mold sections 10 and 11 move into abutting relation against the top surfaces of the lower mold sections 12 and 13. In this manner, the relative disposition between the upper mold sections is accurately controlled to insure that neither section will pass the centerline of the tool cavity and thus restrict the proper positioning of the other section, which would otherwise induce a camber in the blade.

During molding, the tool may heat up from the elevated temperatures of the steam passing therethrough so as to expand substantially. Therefore, if necessary, steam also may be passed through the cylinder support 18 to insure that the tool and the tool support structure 15 will expand in like manner to prevent any distortion of the blade being formed in the tool. In this relation, conventional steam and hydraulic circuits (not shown) are employed to control the temperature of the mold and the rotatably opening and closing of the mold sections 10, 11, and 13. Of course, such steam circuits also include the necessary valves to control the entrance of steam through the pipes or to permit the passages of water for cooling purposes if desired.

To illustrate the utilization of the tool in a multiple stage formation of a rotor blade, there is shown (see FIGURE 5) a mandrel 70 for bonding the leading edge section of the plastic blade. Although not shown, the leading edge section would rest in the bottom area L of the mold cavity. The mandrel 70 employs two pressure blocks 71 and 72 extending the length of the tool from station B to the outboard end, which is remote from station A. A plurality of support cylinders or rods 74 extends upwardly from the pressure blocks 71 and 72 and is supported at the upper extremities by a pressure block 76. A plurality of clamp members 79 is connected by pins 80, which are disposed in arcuate slots 81 of the members 79, to the projections 59 of the upper mold sections 10 and 11 for holding the mold sections in substantially determinate positions. Each clamp member 79 also has a threaded bore 82 (see FIGURE 6) through its upper extremity for inserting pressure means 83 therethrough for applying pressure on the upper surface of the pressure block 76. Thus, pressure is transferred through the mandrel to the leading edge assembly held beneath the lower pressure block 71 and against the bottom surface of the mold.

Figure 6:
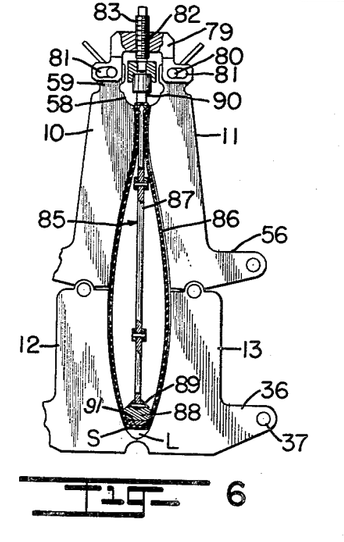
FIGURE 6 is a schematic sectional view showing the disposition of a skin bonding mandrel assembly within the molding apparatus.
Figure 7:
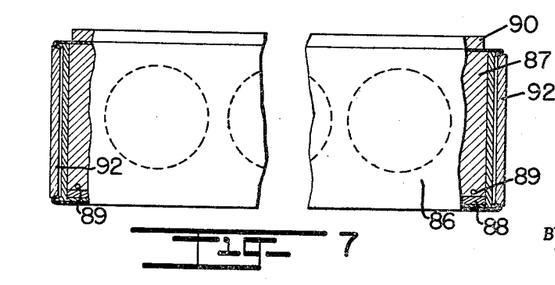
FIGURE 7 is a front view with parts broken away of the mandrel assembly shown in FIGURE 6.
Figure 7A:
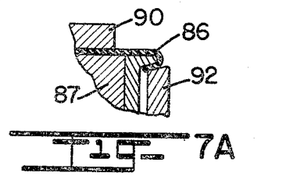
FIGURE 7A is an enlarged view of an end portion of the mandrel illustrated in FIGURE 7.

FIGURES 6, 7, and 7A illustrate a mandrel 85 employed for bonding the external skin of the plastic blade. To form the skin, plies of plastic material may be laid into the mold above the already molded leading edge assembly so as to line the entire cavity wall and to occupy the area, represented at S, between a pressure bag 86 and the walls of the mold cavity. The pressure bag 86 is composed of, for example, rubber into which pressure is applied to cause the bag to conform to the contour of the mold and thereby the contour of the plastic blade desired to be manufactured. This pressure may be steam pressure but also may be other pressure inducing mediums.

A stringer 87, which is employed within the pressure bag, has a pressure base 88 connected thereto by a plurality of pins 89. The base portion 91 is constructed of an elastic material to insure that the mandrel 85 is guided into an accurate position with respect to the skin of the blade and the leading edge assembly for insuring that the blade skin assumes the desired position. The stringer 87 extends upwardly from the bottom of the pressure bag 86 against the top of the pressure bag to cause the upper surface of the pressure bag 86 and the mandrel 85 to contact a pressure block 90. With the clamps or clamp members 79 connecting the projections 59 of the mold sections 10 and 11, the pressure means 83 may be inserted and applied through each of the bores 82 in the clamps 79 and against the upper surface of the pressure block 90 for applying downward pressure to the entire mandrel. Additionally, as shown in FIGURES 7 and 7A, the inboard and outboard extremities of the pressure bag 86 include metal blocks 92 for closing the ends of the pressure bag in such a manner that the pressure exerted into the bag for molding is restricted from acting against the ends thereof.

Figure 8:
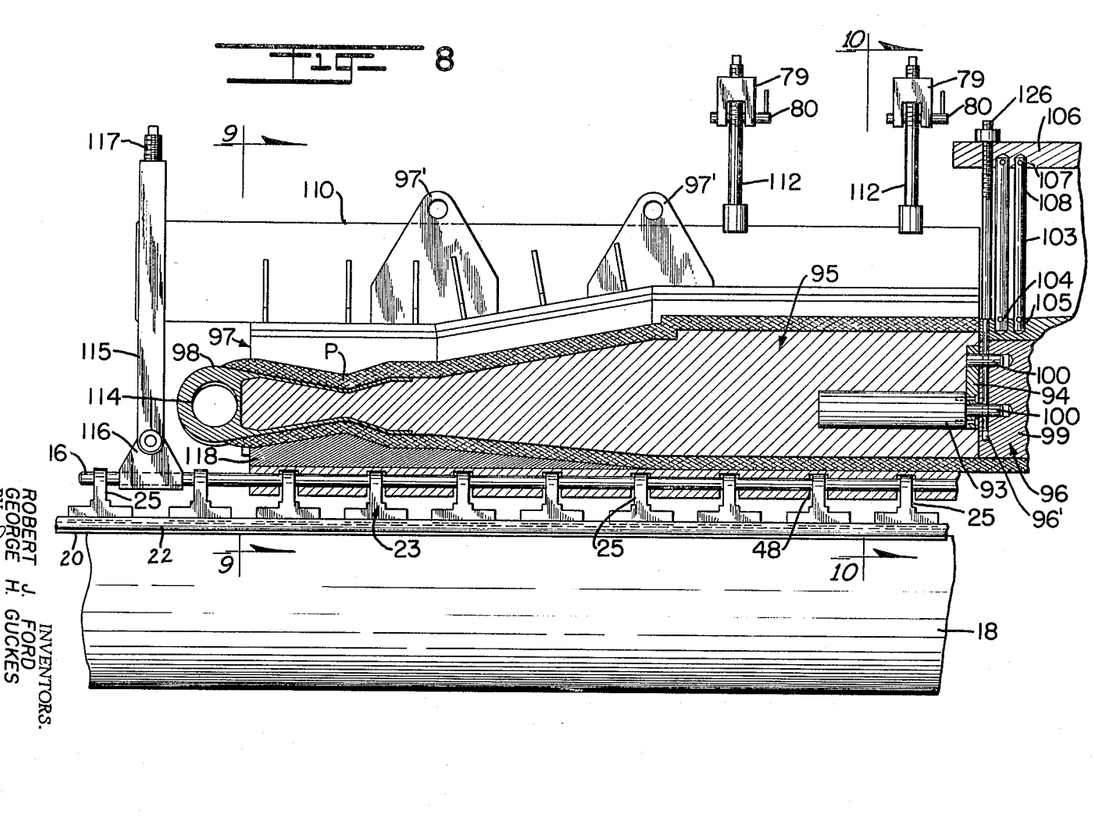
FIGURE 8 is a front view partially in section of a portion of a spar bonding mandrel assembly shown in assembled relation with the molding apparatus.

As illustrated in FIGURE 8, a spar section P is preferably composed of plies of reinforced plastic material, which undergo a transition from circular to somewhat elliptical along an inboard portion and then to an arcuate shape throughout an outboard portion thereof. To form the spar section P within the mold, as shown in FIGURES 8 to 10, 12 and 13, the spar bonding mandrel assembly has three basic portions including an inboard mandrel or mandrel assembly 95 (see FIGURE 11) upon which the inboard circular-elliptical portion of the spar is laid up, an outboard mandrel or mandrel assembly 96 upon which the outboard arcuate spar portion (see FIGURE 11) that lies outboard of the inboard mandrel is laid up, and an inboard upper surface former 97, which is employed for bonding the upper inboard portion of the spar.

The inboard mandrel 95 is formed in a separate mold (not shown) and is preferably composed of a lightweight material because, when the spar material is laid upon the mandrel and subsequently cured, the mandrel cannot be removed. In forming the mandrel 95, a shaft 93 and connecting plate 94 including outwardly projecting pins 100 are disposed in the mold to assume the desired relation to the mandrel. Additionally, blade socket 98 is positioned so that the material of the mandrel 95 will fill the internal cavity of the blade socket 98, as shown in FIGURE 8; the blade socket 98 is held at an angle to impart the desired pitch to the mandrel 95 as well as the spar section and plastic blade during subsequent curing or molding operations.

Upon formation, the inboard mandrel 95 is connected to base member 99 of the outboard mandrel 96 by inserting the pins 100 into bores at the inboard end of the base member 99. The pins or fasteners 100 are held in place by suitable means such as a threaded rod 126, positioned vertically through a bore 96' in the base member 99 and through transverse bores in the fasteners 100, which are aligned with the vertical bore 96'. It should be understood that the threaded portion of the threaded rod 126 allows for the removal thereof by simple rotation of a nut member at the upper extremity thereof. The mandrels 95 and 96 are connected, as described, externally of the tool as shown in FIGURE 11 and then, after the spar material is laid upon the mandrels, are inserted into the tool in the relation shown in FIGURES 8, 12, and 13.

Since the outboard mandrel 96 is used to bond the outboard portion of the spar within the skin and leading edge assembly already bonded, the base member 99 thereof tapers as it extends outboard and along its length according to the required thickness and weight of the spar section P. Also, the base member 99 has a width sufficient to limit the upward flow of plastic material during bonding. That is, provision is made for the removal of excess material into a plurality of small slots 101 that lead to internal cavities 101', which extend along both sides of the mandrel 96 (see FIGURES 12 and 13).

Figure 11:
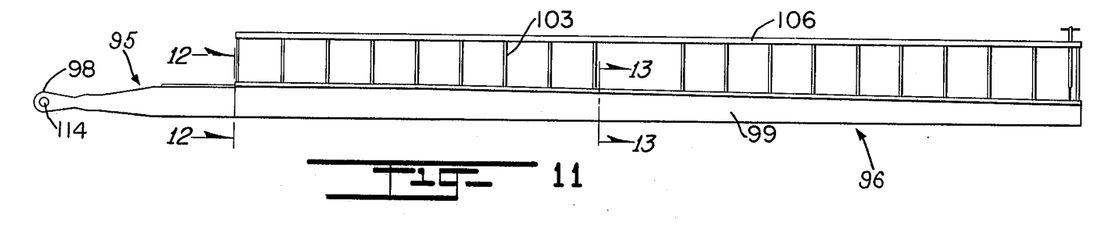
FIGURE 11 is a front view in elevation of the lower inboard and outboard portions of the spar bonding mandrel assembly shown externally of the molding apparatus.
Figure 12:
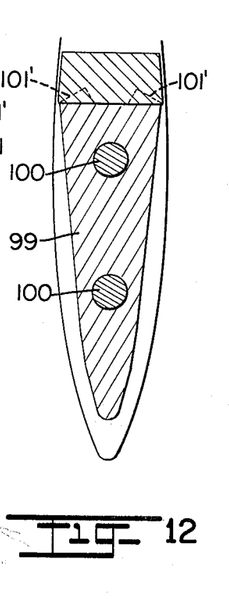
FIGURES 12 and 13 are views taken on lines 12—12 and 13—13 of FIGURE 11, respectively, but illustrating the mandrel assembly in assembled relation with the molding apparatus.
Figure 13:
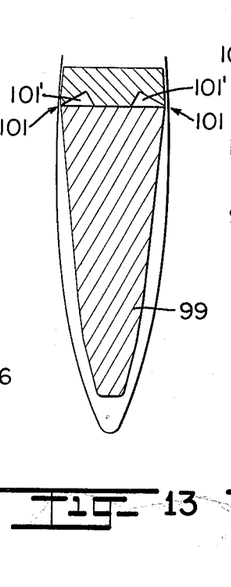

As shown in FIGURES 8 and 11, the mandrel 96 further includes a plurality of upwardly extending cylindrical members or rods 103 spaced along the length of the base member and connected thereto by pins 104 which extend through bores 105. The upper extremities of the cylindrical members 103 are connected to a pressure block 106 by pins 107 in bores 108. Again, by means of the clamps 79 and the bores 82 thereof the pressure means 83 may be inserted through the bores 82 and against the upper surface of the pressure block 106 for exerting downward pressure upon the base member 99. Accordingly, the blade spar is cured in the same manner as described with reference to the leading edge and skin bonding mandrels. Preferably, the mandrel 96 is machined along its length to impart thereto the desired angle to which the blade is to be twisted; however, the other mandrels used with the tool are sufficiently flexible to assume the blade twist to which the tool has been set. It should be understood that, after the mandrel 96 is removed from the mold by first removing the rod 126, the shaft 93, the connecting plate 94, and the pins 100 may be slidably removed from the mandrel 95 to decrease the weight thereof.

Figure 9:
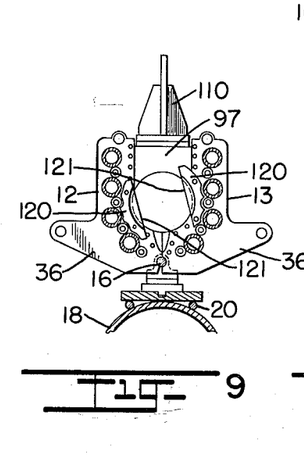
FIGURE 9 is a view of the molding apparatus and a bonding mandrel and taken on line 9—9 of FIGURE 8.
Figure 10:
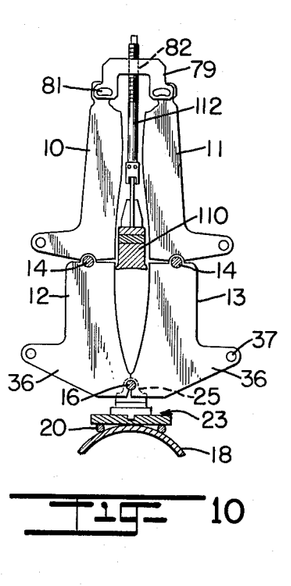
FIGURE 10 is a view of the molding apparatus and bonding mandrel and taken on line 10—10 of FIGURE 8.

The upper former 97 employed for bonding the spar to the upper root end portion of the blade is represented in FIGURES 8 to 10. As clearly set forth in FIGURE 8, the lower exterior portion of the former 97 has an hourglass shape for covering the correspondingly shaped blade socket 98 and the mandrel 95 therein. As shown, the curvature of the former 97 varies along the length of the upper inboard end in spaced relation to the mandrel 95.

Above the former 97, pressure is exerted downwardly against the upper surface of a pressure block 110 by pressure applying members 112, which are held in position by the clamps 79 secured to the upper mold sections 10 and 11 (not shown in FIGURE 8—see FIGURE 10). The end of the pressure block 110 extends outwardly beyond the end of the blade socket and is inserted into a support member 115, which is connected in swiveled relation to the hinge pin 16 by a connector 116. Pressure is exerted downwardly against the pressure block 110 by means of the threaded element 117 so as to cooperate with the members 112 in applying even downward pressure against the former 97. Since the former 97 is independent of the mold, separate heating elements, such as electrical heater cartridges (not shown), are spaced throughout the former 97 for use during the molding operation.

It should be understood that, while the mandrels 95 and 96 are interconnected externally of the tool, the former 97 is not employed until the mandrels 95 and 96 are inserted into the tool. Ears 97' are provided on the former 97 for the purpose of handling and positioning the former 97 in place.

Also, an insert 118 is positioned beneath the blade socket 98 to insure that the spar is molded to the desired shape in this area. However, the insert 118 is merely employed to allow the inboard laminations to be stamped to the same general configuration as the outboard laminations. This also requires the inboard laminations to be additionally cut out to receive the root end portion of the blade. Accordingly, if the inboard laminations are accurately stamped to their final configuration, the insert 118 is not necessary.

In order that the desired blade pitch is produced as the spar and final blade structure are formed and bonded within the mold, the blade socket 98 is positioned with the axis of a bore 114 thereon extending at an angle of, for example, 15 degrees with respect to horizontal. As shown in FIGURE 9 positioning members 120, for holding the socket 98 in the desired position, are attached to the lower mold sections 12 and 13 and have inner, flat surface portions 121 bearing against the flat surfaces of the socket at opposite ends of the bore 114.

Following formation and molding of the spar within the skin, a core, root and tip ribs, and trailing edge wedge sections may be inserted within the skin all in a manner set forth in detail in the aforementioned copending application for patent of Robert J. Ford and Thadeusz Tarczynski. The entire blade assembly is then placed into a vacuum bag (not shown) of, for example, Teflon and placed into the mold. Before the mold is heated and at approximately room temperature, the vacuum bag is connected to a pump for evacuating the air that is in the vacuum bag. The use of this vacuum bag insures a uniform application of pressure along all points of the skin and core to secure a firm bond therebetween during subsequent bonding.

After the air within the honeycomb cells of the core is evacuated and the skin is uniformly held against the core surface, the mold is closed and heated to bond the blade assembly. Thereafter, the blade assembly is removed from the mold and the vacuum bag for subsequent finishing operations such as trimming and sanding.

The particular form and arrangement of the mandrels used in conjunction with the apparatus of the present invention are given as being merely illustrative and for the purpose of describing the utilization of the preferred form of molding apparatus in the formation of a rotor blade. Accordingly, it should be understood that the novel features of construction and arrangement of the apparatus would have application individually and together in numerous types of molding operations. Additionally, it should be understood that a liner (not shown in the drawings) will be included along the internal cavity of the mold for protection against the flow of plastic to be cured therein while the mold is at elevated temperatures. Without the liner the plastic might flow between the laminations and into the hinges of the mold.

From the foregoing, it can be clearly understood that this invention was developed for and has the capability of producing a plastic blade, which is economical to manufacture and is non-corrosive and lighter in weight while having the stiffness and strength required thereof. Further, this invention has hinged members that are variably positionable to enable the use of the invention in at least partially opened condition. Additionally, the tool of this invention allows either single or multiple stage preparation of a bonded part and provides for adjusting the degree and direction of blade twist of a blade formed therein.

For purposes of exemplification, a particular embodiment of the invention has been shown and described according to the present understanding thereof. However, it will be apparent that changes and modification in the arrangement and construction of the parts thereof may be resorted to without departing from the spirit and scope of the invention.

We claim:

1. A mold comprising a base support, complementary mold portions pivotally mounted on said base support to define a mold cavity therebetween, each of said mold portions being defined by longitudinally extending first and second laminated mold sections interconnected along lateral edges in hinged-together relation, mold supporting means between said mold portions and said base support to support said mold sections in predetermined relation, and clamping means between said first mold sections to removably interconnect said first mold sections in predetermined relation.

2. A mold according to claim 1 being further characterized by connecting elements and heating elements extending through aligned apertures in each of said mold sections.

3. The molding apparatus according to claim 2 further comprising a plurality of formers for successive positioning in the mold cavity to engage material to be molded therein, actuating means to move at least one of said mold portions between open and closed positions, means to adjustably position said mold portions according to the size and contour of each former positioned in the mold.

4. The molding apparatus according to claim 1 further comprising a former removably disposed in the mold cavity for engaging an object to be molded therein, and clamping means removably interconnecting said mold portions and in substantially opposite spaced relation with respect to said connecting means, said clamping means including pressure applying means being adapted to urge said former into engagement with the object to be molded.

5. A mold according to claim 1, said mold supporting means including actuating means disposed between each of said first and said second mold sections to control the pivotal relation therebetween according to the size and shape of objects positioned in the mold cavity.

6. A mold comprising complementary mold halves defining a mold cavity therebetween, each half including first and second mold sections, common connecting means between said mold halves pivotally interconnecting first lateral edges of said second mold sections, and means interconnecting adjacent lateral edges of each of said first and said second mold sections to provide for limited inward and outward pivotal movement of each first mold section with respect to each respective second mold section, mold supporting means including adjustable supporting means connected at spaced intervals along said mold halves and actuator means connected at spaced intervals along at least one of said mold halves cooperating together to adjustably support said mold halves in predeterminel relation in open and closed positions, a former disposed in the mold cavity to engage an object to be molded therein, and pressure applying means to urge the former into engagement with the object under a predetermined pressure.

7. Molding apparatus comprising an elongated base support; complementary mold halves including upper and lower mold sections, said lower mold sections being disposed in upstanding relation on said base support, means interconnecting said lower mold sections for limited pivotal movement about said base support, said upper mold sections being coextensive with one another and extending along at least a portion of the upper surfaces of said lower mold sections to define a common continuous mold cavity between said mold halves, means interconnecting said upper and lower mold sections for limited pivotal movement of said upper mold sections with respect to said lower mold sections, adjustable connecting members between said lower mold sections and said base support to selectively control the contour of the mold cavity formed between said mold sections, first actuating means between one of said mold halves and said base support to provide for pivotal movement between open and closed positions, and second actuating means between the upper and lower mold sections of at least one of said mold halves to support said mold sections in predetermined pivotal relation to selectively vary the size of the mold cavity area between said upper mold sections independently of the mold cavity area formed between said lower mold sections.

8. Molding apparatus according to claim 7, each of said mold sections being defined by a series of laminations arranged in abutting face-to-face relation, means interconnecting the laminations of each mold section to provide for limited parallel movement between laminations thereby to selectively vary the angular disposition of the mold sections and being individually adjustable to con- disposed at spaced intervals along the length of said lower mold sections and being individually adjustable to control the relative disposition between the laminations in said lower mold section along the length of the mold cavity.

9. Molding apparatus according to claim 7, said base support including upwardly extending aligned hinge portions at spaced intervals therealong, said lower mold sections having complementary ears and grooves along the lower surfaces thereof disposed in complementary relation with said hinge portions, and a hinge pin extending through aligned openings in said hinge portions and said ears to interconnect said mold sections and said base support in pivotal relation.

10. Molding apparatus according to claim 7, said upper and lower mold sections having outwardly projecting complementary ears and grooves between adjacent surfaces thereof, a hinge pin extending through aligned openings in said ears to interconnect said upper and lower mold sections, and one of the adjacent surfaces between each of said upper and lower mold sections being relieved to provide for limited pivotal movement of each of said upper mold sections about said lower mold section.

11. Molding apparatus according to claim 7, said upper and lower mold sections having outwardly projecting groups of ears at spaced intervals therealong to provide for connection to said connecting members and to said first and second actuating means to said mold sections.

12. A molding apparatus comprising complementary mold structures defining a mold cavity therebetween, each of said mold structures comprising first and second portions, base hinges interconnecting said complementary mold portions below the mold cavity to allow said first portions of said complementary mold structures to rotate with respect to each other, said second portions hingedly mounted on said first portions at points distant from said first hinges to allow movement of said first portions with respect to said second portions with the result that the portions of the molding apparatus may be adjusted to handle a wide variety of spar sizes.

13. A molding apparatus comprising complementary mold shells defining a mold cavity therebetween, each of said mold shells having first and second portions, hinge means at one extreme end of the mold cavity to allow the first portions of the mold shells to rotate with respect to one another, pivotal connection means connecting said first portions of the shells with said second portions to allow said second portions to rotate with respect to said first portions and with respect to each other, adjustment means connected to said mold shells to adjust the angular position of the shells with respect to one another so that articles of various size and shapes might be processed.

14. The mold shells set forth in claim 13 comprising laminated segments adjustable with respect to one another and connecting means joining said laminated segments to one another.

15. The laminated segments set forth in claim 14 comprising various shapes to allow molding of a wide variety of configurations.

References Cited by the Examiner
UNITED STATES PATENTS

| | | | |
|---|---|---|---|
| 2,553,744 | 5/51 | Brammer | 22—92 XR |
| 2,881,486 | 4/59 | Soref | 18—34 XR |
| 2,968,082 | 1/61 | Schutze et al. | 25—2 XR |

WILLIAM J. STEPHENSON, *Primary Examiner.*

MICHAEL V. BRINDISI, *Examiner.*